United States Patent [19]

Winter et al.

[11] Patent Number: 4,949,894
[45] Date of Patent: Aug. 21, 1990

[54] METHOD AND APPARATUS FOR FORMING ULTRA-SMALL OPTICAL FIBER CABLE ASSEMBLIES

[75] Inventors: Joseph Winter, New Haven; Michael J. Pryor, Woodbridge, both of Conn.

[73] Assignee: Olin Corporation, New Haven, Conn.

[21] Appl. No.: 618,271

[22] Filed: Jun. 7, 1984

[51] Int. Cl.$^5$ .............................................. H04B 9/00
[52] U.S. Cl. ................................... 228/148; 228/200; 228/173.7
[58] Field of Search ............. 228/148, 176, 200, 173.7

[56] References Cited

U.S. PATENT DOCUMENTS

| | | | |
|---|---|---|---|
| Re. 28,961 | 9/1976 | Tsukamoto et al. | 156/54 |
| 435,629 | 9/1890 | Holcombe | 156/54 |
| 1,531,730 | 3/1925 | Bundy | 228/40 |
| 2,683,099 | 7/1954 | Hahn | 228/42 X |
| 3,332,814 | 7/1967 | Yoshimura et al. | 156/54 |
| 3,430,330 | 3/1969 | Garner | 228/148 |
| 3,558,378 | 1/1971 | Marantz | 156/54 |
| 3,866,307 | 2/1975 | Pfahl, Jr., et al. | 228/34 X |
| 3,874,076 | 4/1975 | Tsukamoto et al. | 156/54 |
| 4,199,224 | 4/1980 | Oestreich | 350/96.23 |
| 4,232,935 | 11/1980 | Rohner et al. | 350/96.23 |
| 4,239,336 | 12/1980 | Parfree et al. | 350/96.23 |
| 4,257,675 | 3/1981 | Nakagome et al. | 350/96.23 |
| 4,341,440 | 7/1982 | Trezequet et al. | 350/96.23 |
| 4,367,917 | 1/1983 | Gray | 156/54 |
| 4,372,792 | 2/1983 | Dey et al. | 350/96.23 |
| 4,375,313 | 3/1983 | Anderson et al. | 350/96.23 |
| 4,390,120 | 6/1983 | Broyer | 228/180.1 |
| 4,508,423 | 4/1985 | Winter et al. | 350/96.23 |

FOREIGN PATENT DOCUMENTS

| | | |
|---|---|---|
| 1012349 | 7/1957 | Fed. Rep. of Germany ........ 156/54 |
| 2507648 | 9/1976 | Fed. Rep. of Germany . |
| 2507649 | 9/1976 | Fed. Rep. of Germany . |
| 1583520 | 1/1981 | United Kingdom . |
| 1592191 | 7/1981 | United Kingdom . |
| 2091903A | 8/1982 | United Kingdom . |

*Primary Examiner*—Kenneth J. Ramsey
*Attorney, Agent, or Firm*—H. Samuel Kieser

[57] ABSTRACT

A process and apparatus for fabricating an optical fiber cable core assembly having at least one optical fiber encapsulated with an ultra-small diameter metallic tube are described. The optical fiber cable core assembly is formed by passing a metal or metal alloy strip through at least one die to form the ultra-small diameter tube, inserting at least one optical fiber or fibers into the tube during the tube formation operation and passing the assembly through a sealing station to seal the tube and provide a hermetic core assembly. To reduce the likelihood of breaking the tube and damaging the optical fiber or fibers therein, the deformation energy for forming the strip into the tube is provided by wrapping the assembly about a tensioning device positioned between the tube forming station and the tube sealing station.

22 Claims, 3 Drawing Sheets

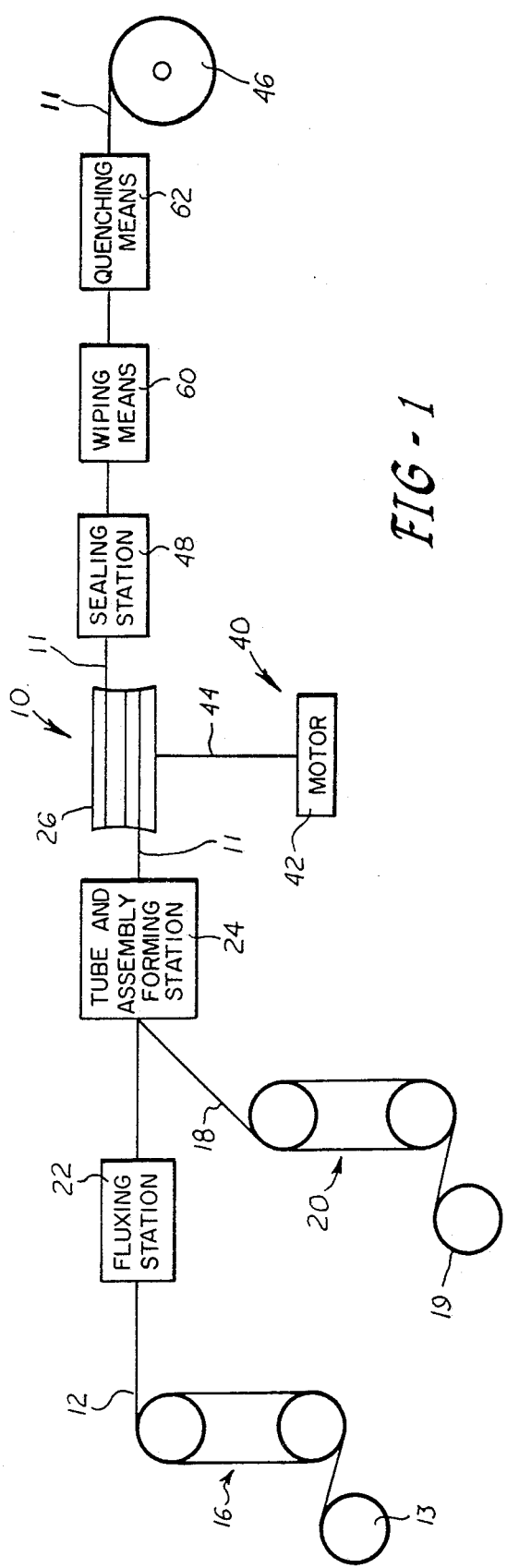
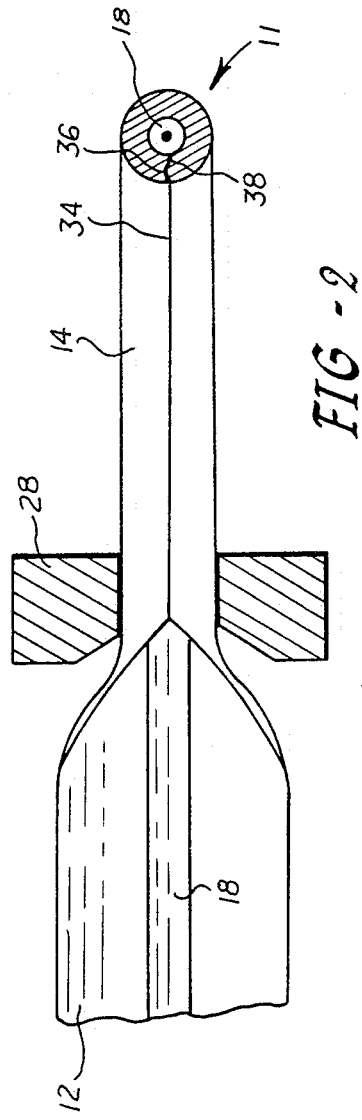

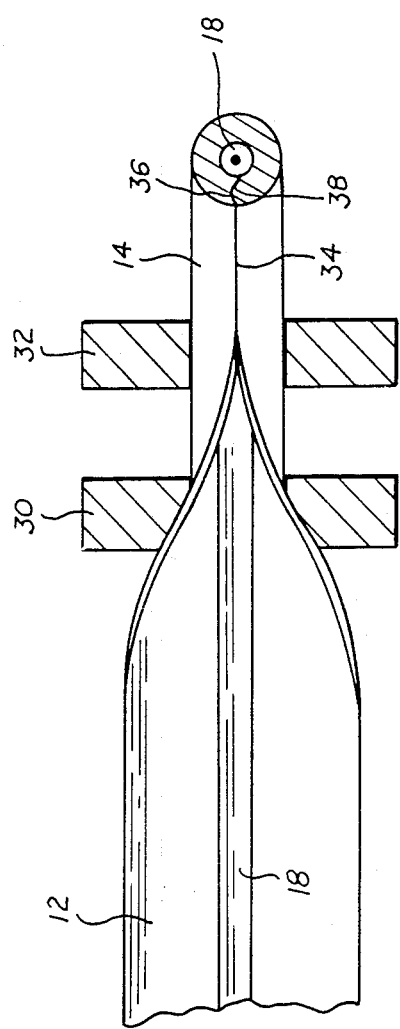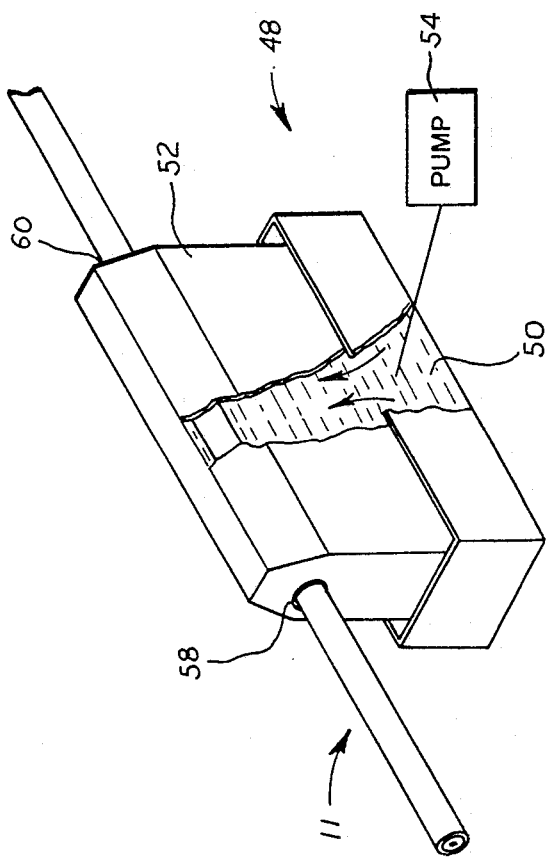

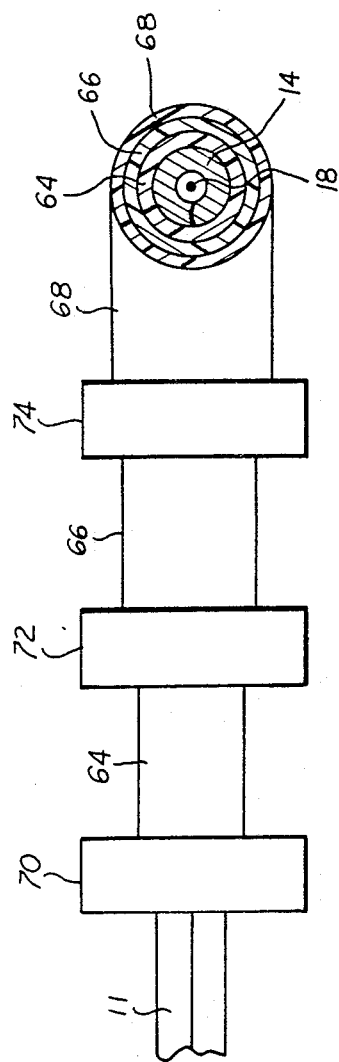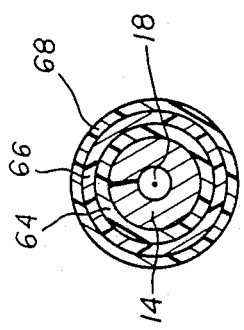

METHOD AND APPARATUS FOR FORMING ULTRA-SMALL OPTICAL FIBER CABLE ASSEMBLIES

The present invention relates to a process and apparatus for fabricating ultra-small diameter optical fiber cables.

In recent years, there has been a great deal of activity in the field of transmitting information using light waves. These developments have led to the advent of optical fiber transmission cables having glass fibers to guide light beams. Many of these optical fiber transmission cables consist of non-metallic optical fiber assemblies. While non-metallic optical fiber assemblies are capable of transmitting information, they often suffer from a number of serious deficiencies. For example, they are extremely fragile and have a low tensile strain. Consequently, they break easily when subjected to some of the extreme forces and stresses encountered during ordinary service. When these assemblies encounter short-range compressive forces, kinks which result in unacceptable attenuation increases in the fiber often occur.

To overcome these problems, it has been proposed to armor the optical fiber or fibers with a metallic tube. The tube primarily serves to protect the fragile fibers from the forces and stresses encountered during service. In some assemblies, the metallic tube also serves as an electrical conductor for transmitting power to repeaters, sensors and other electrical devices. A variety of techniques for forming these cable assemblies are known in the art. U.S. Pat. Nos. 4,199,224 to Oestrich, 4,232,935 to Rohner et al, 4,257,675 to Nakagome et al 4,341,440 to Trezeguet et al, 4,367,917 to Gray and 4,372,792 to Dey et al, U.K. Pat. Nos. 1,583,520 and 1,592,191, both to Chapman, U.K. Patent application No. 2,091,903A to Sadler et al, German Offenlegungsschrift 2,507,648 to Tscharntke et al and German Offenlegungsschrift 2,507,649 to Tscharntke illustrate some of the prior art cable fabrication techniques.

One cable fabrication technique, having several variations, forms the protective armor or containment tube by using one or more dies or draw plates. In this technique, a strip of metal or metal alloy to be formed into the protective tube passes through at least one die or draw plate. In a first variation, a metallic strip is formed into a containment tube using one or more folding dies. The Dey et al and Chapman '520 patents illustrate the use of such folding dies. In a second variation, draw plates are used to form the containment tube about a metal casing housing at least one optical fiber. The Trezguet et al patent illustrates this approach. In still another variation, the containment tube is formed by pulling the metal or metal alloy strip through at least one forming die in such a manner that a tube having a substantially closed, longitudinally extending seam and a wall thickness substantially equal to the initial thickness of the strip is formed. In addition, the tube formed in this variation also has a length greater than the original strip length. These characteristics distinguish the tube formed in this manner from a tube formed using folding dies. Co-pending U.S. patent application Ser. Nos. 395,443, filed July 6, 1982, now U.S. Pat. No. 4,479,702,to Pryor et al; 413,846, filed Sept. 1, 1982, now U.S. Pat. No. 4,508,423, to Winter et al.; 497,533 and 497,546, both filed May 24, 1983 to Winter et al., 497,535, now U.S. Pat. No. 4,555,054, and 497,639, now U.S. Pat. No. 4,477,147, both filed May 24, 1983, to Winter et al; and 505,000, filed June 16, 1983, to Winter et al. illustrate this approach.

While these approaches have been found to be particularly suitable for fabricating assemblies having large diameter containment tubes, above 0.1" in outer diameter, they do not readily lend themselves to the fabrication of ultra-small diameter containment tubes. In most of these cable assembling techniques, a single tensioning device such as a take-up reel is used to apply the force needed to pull the optical fiber or fibers and the metal strip through the tube forming and cable assembling apparatus. This tensioning device is also used to pull the cable assembly including the containment tube through a tube sealing station. Consequently, the pull force applied to the cable assembly as it passes through the tube forming and cable assembling apparatus is also applied to the assembly as it passes through the sealing station. As the metallic containment tube passes through the sealing station, the exposure to the elevated temperatures associated with sealing often derates the metal. Tube breakage often results from the application of a relatively large force to the metal when the metal is at its lowest mechanical properties. This problem can be particularly troublesome when attempting to fabricate ultra-small diameter tubes from relatively thin metal strips. As used herein, the term "ultra-small diameter tubes" means tubes having an outer diameter of less than 0.1".

Other problems associated with the use of these prior art approaches to fabricate ultra-small diameter tubes for optical fiber cable assemblies include the inability to use protective structures about the optical fiber or fibers during the tube forming and sealing operations and the inability to use a filler material to assure minimization of gaps and bubbles in the assembly. The latter problem may be particularly significant when the final cable assembly is to be used in undersea applications. In undersea applications, gaps and bubbles in the cable assembly can adversely affect cable buoyancy and information transmission.

In accordance with the present invention, a technique for forming ultra-small diameter tubes for optical fiber cable assemblies which overcomes the problems associated with prior art approaches is provided. The cable forming technique of the present invention comprises encapsulating at least one optical fiber in a metallic containment tube formed from a metal or metal alloy tape and thereafter sealing the tube with an appropriate sealing material to provide a hermetic cable assembly. To overcome the most serious deficiency of the other fabrication approaches, a tensioning device is interposed between the tube forming station and the tube sealing station. This tensioning device provides the force and deformation energy needed to pull the tape and the optical fiber or fibers through the tube forming station. The main advantage of the present approach is that the force and energy needed to overcome the forces and stresses created in the tube forming station is applied only to cold metal which has not been derated. It also permits the application of a reduced tensile force to the cable assembly as it passes through the tube sealing station. This latter feature reduces the likelihood of breaking the metal tube and damaging the fiber or fibers contained therein.

The present fabrication technique also decreases the risk of damaging the optical fiber or fibers and breaking the metallic tube encapsulating the fiber or fibers by minimizing the exposure of these elements to the elevated temperatures associated with tube sealing. Further, the present technique substantially avoids the formation of gaps and bubbles by closely surrounding the optical fiber or fibers with the metallic containment tube.

The optical fiber cable assembly formed by the present invention comprises a metallic containment tube closely surrounding at least one buffered optical fiber. The containment tube is preferably formed from a metal or metal alloy tape having a desired set of strength and conductivity properties. The encapsulation procedure comprises forming the containment tube about the buffered optical fiber or fibers by pulling the tape and each fiber through at least one tube forming die. The force needed to pull the tape and each fiber through the at least one forming die is provided by wrapping the cable assembly about a tensioning device. The tensioning device utilizes friction as the mechanical coupling between itself and the cable assembly. In a preferred embodiment, the tensioning device comprises a capstan or bull block having a drive system associated therewith.

After exiting the tensioning device, the cable assembly passes through a tube sealing station to form a hermetic cable assembly. Tube sealing is preferably accomplished by pulling the cable assembly through a wave of sealing material. The sealing material may be either a solder or a brazing material. After being sealed, any excess sealing material is removed by passing the assembly through an appropriate wipe. Thereafter, the assembly is quenched to cool it and wound upon a take-up reel. If desired, one or more external protective layers may be fabricated about the cable assembly.

It is an object of the present invention to provide an apparatus and process for fabricating optical fiber cable assemblies having ultra-small diameter metallic containment tubes.

It is a further object of the present invention to provide an apparatus and process as above that reduces the likelihood of breaking the metallic containment tube and damaging the optical fiber or fibers during fabrication.

These and other objects and advantages will become more apparent from the following description and drawings wherein like reference numerals depict like components.

FIG. 1 is a schematic representation illustrating the optical fiber cable fabrication system of the present invention.

FIG. 2 is a cross sectional view of a first embodiment of a tube forming apparatus to be used in the system of FIG. 1.

FIG. 3 is a cross sectional view of an alternative tube forming apparatus embodiment to be used in the system of FIG. 1.

FIG. 4 is a view in partial cross section of the tube sealing apparatus.

FIG. 5 is a cross section view of an optical fiber cable assembly formed in accordance with the present invention.

FIG. 6 is a schematic representation of a system for fabricating one or more external layers about the optical fiber cable assembly.

In accordance with the present invention, it is proposed to provide an improved process and apparatus for fabricating optical fiber cable assemblies having ultra-small diameter metallic containment tubes for housing the optical fiber or fibers. The process and apparatus of the present invention represent an improvement over prior art techniques in that the risk of breaking the metallic tube and damaging any optical fiber or fibers contained therein during fabrication is significantly reduced. This is accomplished by placing a tensioning device between the tube forming station and the tube sealing station and using the tensioning device to provide the deformation energy needed to pull a continuous metal or metal alloy tape or strip through the tube forming station. By placing the tensioning device in this position, the deformation energy is applied to the metal or metal alloy tape only when the metal is cold. This is different from those prior art systems where the deformation energy is applied to the metal during tube forming and during tube sealing when the metal has been derated by exposure to the elevated temperatures associated with most conventional sealing operations. In those prior art systems, there is a substantial risk of breaking the metal tube when it is in its derated condition.

Referring now to FIGS. 1-4, a system 10 for fabricating an optical fiber cable core assembly 11 in accordance with the present invention is illustrated. In this system, a metal or metal alloy tape 12 from which the containment tube 14 is formed is payed off a reel 13 and wound about an accumulator or dancer 16. The accumulator 16 permits accumulation of a length of tape 12 sufficient to assure a substantially constant tape delivery rate to all downstream apparatus. The accumulator 16 may comprise any conventional accumulator known in the art.

The tape 12 comprises a continuous strip of a metal or metal alloy possessing a desired set of physical properties. The desirability of various physical properties depends upon the application for the cable assembly. For example, where the tube 14 is to function as an electrical conductor as well as a protective strength member, the tape material should possess high strength and high electrical conductivity. Where the tube 14 is to be used primarily as a strength member, the tape material may be a very high strength, low conductivity material. For most applications, strength is the paramount consideration. Consequently, it is desirable for the tape material to have a relatively high yield strength. Other desirable properties include good resistance to softening upon short term exposure to elevated temperatures and the ability to sustain coiling forces during fabrication and installation.

Preferably, the tape material has a conductivity in the range of about 2% to about 102% IACS, a yield strength of at least about 30 ksi, most preferably at least about 50 ksi, a yield strain in the range of about 0.15% to about 1%, most preferably from about 0.3% to about 0.95% and a diameter-to-thickness ratio of about 3:1 to about 25:1, preferably from about 4:1 to about 20:1. As used herein, the term yield strain is the strain at the yield strength at 0.2% offset.

A wide range of ferrous and non-ferrous metallic materials possess these desired properties and may be used; however, it is preferred to use a copper base alloy for the tape material. Suitable copper base alloys include a high copper alloy containing zirconium produced by Olin Corporation and designated Copper Alloy 151 and alloys C15500, C19400, C19500, C63800 and C68800.

The tape material may have any desired cross sectional shape. For example, the tape 12 may have a rectangular cross sectional shape. Where a tape having a rectangular cross sectional shape is used, the tape width should be at least about equal to the outer circumference or periphery of the desired containment tube construction. In a preferred approach, the tape material 12 has a trapezoidal cross section. It has been discovered that tape material having such a cross sectional shape are subjected to reduced forces and stresses when pulled through one or more tube forming dies. For reasons to be discussed more fully hereinafter, it is also desirable to use a tape 12 having a transverse cross sectional area which exceeds the desired transverse cross sectional area of the tube 14 by about 5% to about 20%, preferably by about 8% to about 17% and most preferably by about 10% to about 15%.

It is also desirable for the tape material to have sufficient hardness to enable it to be formed into a tube by being drawn through one or more forming dies. Accordingly, the tape material should be in a wrought and partially work hardened condition. Preferably, the tape material is at least about ¼ hard and most preferably at least about full hard.

The optical fiber 18 may comprise any commercially available buffered optical fiber. Generally, such an optical fiber consists of optical grade glass having an approximate diameter of about 0.001" coated by one or more layers of a buffer material such as nylon, polyvinyl formal, fluoroethylenepropylene copolymers, polyetylene, other acrylic materials and a coating sold under the trademark HYTREL by duPont. While any suitable optical fiber known in the art may be used, it is preferred to use an optical fiber capable of withstanding exposure to temperatures as high as 260° C. for about 1 second in a limited atmosphere without seriously degrading.

To fabricate an optical fiber cable assembly in accordance with the present invention, the optical fiber 18 is also payed off a reel 19 and wound about an accumulator or dancer 20 from which it is fed into the tube forming and cable assembling station 24. The fiber accumulator 20 serves several important purposes in the inventive scheme. First, it assures that there is sufficient slack in the optical fiber 18 to avoid the formation of kinks or snags that may seriously damage the optical fiber. Second, it assures that there is a sufficient supply of optical fiber 18 to travel along with the tape 12 and the tube 14 as it is formed. If needed, the accumulator 20 may also apply a back tension to the fiber 18.

While FIG. 1 illustrates only a single fiber 18 being fed into the tube forming and cable assembly station 24, it is within the purview of the present invention to insert more than one optical fiber into the assembly 11. The fibers may be inserted separately or as a preformed composite e.g. a rope of optical fibers. When inserting separate fibers, each fiber should be fed off its own reel not shown and wound about its own accumulator not shown.

To form the cable assembly 11 of the present invention, the metallic tape 12 is first drawn or pulled through a fluxing station 22. The fluxing station 22 may comprise any suitable flux applying apparatus known in the art. The flux applying station 22 applies a small amount of flux lubricant preferably to that tape surface which contacts the tube forming apparatus and forms the outer periphery of the tube 14. The flux lubricant primarily minimizes the friction created during the tube forming operation. In addition, it protects the surface forming the outer periphery of the tube 14 so that its solderability is not diminished. While any suitable flux lubricant known in the art may be used, it is preferred to use a flux lubricant that is water soluble so that it can be easily removed later on.

After passing through the flux station 22, the tape 12 is pulled through the tube forming and cable assembling station 24. At the same time that the tape is being fed into the station 24, the fiber or fibers 18 are being pulled into the station 24 in such a manner that the tube 14 is formed about the fiber or fibers 18. In accordance with the present invention, the force for pulling or drawing the tape 12 and the fiber or fibers 18 through the station 24 is provided by a tensioning device 26. The manner in which the tensioning device 26 provides this force will be discussed more fully hereinafter.

Referring now to FIG. 2, while the tube forming and cable assembling station 24 may comprise any suitable tube forming apparatus known in the art, it is preferred to form the tape 12 into the tube 14 using a single tube forming die 28. The die 28 may comprise any suitable die known in the art as long as it is capable of forming the tape 12 into a tube 14 circumferentially encapsulating the fiber. Preferably, the die bore is sized to form a tube having an outer diameter in the range of about 0.020" to about 0.060". In a most preferred configuration, the tube 14 is formed with an outer diameter in the range of about 0.030" to about 0.050". Using this one die approach, a tube 14 having a generally longitudinally extending seam 34 that is in a somewhat relaxed condition is formed.

Where it is desired to form a tube 14 having a seam 34 that is in a state of compression, the one die station of FIG. 2 may be replaced by the two die station of FIG. 3. In the embodiment of FIG. 3, the tape 12 is formed into the tube 14 by passing through two forming dies 30 and 32. As the tape 12 passes through the die 30, it is formed into an open tube section in whose center the fiber or fibers 18 is positioned. As this assembly passes through the second die 32, the open tube section is closed about the fiber or fibers 18 and the seam 34 is placed into compression. While dies 30 and 32 may comprise any suitable dies known in the art, it is preferred to use a die having a substantially circular bore with a relief notch for the die 30 and a bending-expansion die 32. In both tube forming station embodiments, the tube 14 may be formed with the longitudinally extending seam 34 having any desired orientation. For example, the seam 34 could be formed facing downwardly.

As previously mentioned, it has been found to be advantageous to form the tube 14 from a tape 12 having a transverse cross sectional area greater than the desired transverse tube cross sectional area. Using the tube forming techniques described hereinbefore, the extra volume of material provided by the excess cross sectional area shows up in the tube 14 essentially as longitudinal extension. It has been found that in using the above tube forming techniques, there is no significant change in wall thickness. The wall thickness of the tube 14 is substantially the same as the thickness of the tape 12. The tube forming techniques described herein are, therefore, similar to "tube sinking". The total length of the tube 14 will be greater than the total length of the tape 12 due to the aforenoted longitudinal tube extension. The amount of extension in the tube substantially corresponds to the aforenoted percentage differentials in tape cross sectional area versus tube cross sectional area.

The extra volume of material also assists in the formation of a tube 14 having a relatively tight seam 34 characterized by closely abutting edges 36 and 38. In addition, no well or notch is formed at the outer periphery of the seam 34. Further, the edges 36 and 38 forming the seam 34 are deformed by the tube-forming techniques described herein to provide substantially non-linear, intermeshing edges. This results in an increased surface area of the edges to which a sealing material can adhere as compared to the edges of the starting tape 12 thereby improving the resultant strength of the seal. This also assists in providing the optical fiber cable assembly with improved hermeticity.

The deformed, intermeshing edges 36 and 38 are the inherent result of the tube forming technique used herein and do not correspond to the shape of the original tape edges. The deformed edges 36 and 38 result from the drawing or sinking of the tube by the tube-forming techniques described herein.

As previously mentioned, the force or deformation energy needed to pull the tape 12 and the fiber or fibers 18 through the station 24 is provided by the tensioning device 26. In a preferred embodiment, the tensioning device 26 comprises a bull block or capstan positioned between the station 24 and the sealing apparatus 48, most preferably positioned in close proximity to the station 24. The tensioning device 26 may comprise any conventional bull block or capstan known in the art and may be oriented to rotate about any desired axis. Preferably, the tensioning device 26 is oriented to rotate about an axis substantially transverse to the direction of travel of the tape 12 and tube 14. The tensioning device 26 preferably is driven by a drive mechanism 40. The drive mechanism may comprise any suitable motor 42 and drive means 44 e.g. belts, gears or the like, known in the art. If desired, the drive mechanism may be omitted.

The tensioning device 26 utilizes friction as the mechanical coupling between the cable assembly 11 and itself. The amount of pull exerted on the assembly is determined by the number of wraps of the assembly 11 around the tensioning device 26 and the exit tension applied to the assembly 11 leaving the tensioning device 26 by the take-up reel 46. The number of assembly wraps about the tensioning device 26 should be balanced to provide sufficient contact between the tube 14 and the tensioning device 26 while permitting some degree of transverse motion along the tensioning device. If there are too large a number of wraps, the desired transverse motion needed for the invention to operate properly may be prevented.

One of the advantages of this system is that the deformation energy needed to pull the tape 12 through the station 24 to form the tube 14 and to overcome the forming stresses encountered therein is only applied to the metal or metal alloy when it is in a cold condition. In prior art systems, this deformation energy has been applied to the metal or metal alloy when it is in a derated condition, i.e., after it has been exposed to the elevated temperatures associated with sealing. By applying the deformation energy to the derated metal or metal alloy forming the containment tube, there is a significant risk of breaking the tube and damaging the fiber or fibers housed therein. The system 10 of the present invention significantly reduces the likelihood of breaking the metallic tube 14 during the fabrication process.

After leaving the tensioning device 26, the assembly 11 is passed to a sealing station 48 for sealing the seam 34 in tube 14. While any suitable sealing technique known in the art may be used to seal the seam 34, it is preferred to seal the seam 34 by rapidly passing the tube 14 and its seam 34 through a wave of sealing material.

Referring now to FIG. 4, a sealing station 48 having means for creating a wave of sealing material is illustrated. The sealing station 48 preferably comprises a sump or bath 50 of a sealing material such as solder or abrazing material. To keep the sealing material in a molten state, the sump 50 may be provided with any suitable heating device (not shown) known in the art such as heating coils. The sealing station also has a closed plenum chamber 52 into which the sealing material is pumped to create the sealing material wave. Any suitable pump 54 known in the art may be used to pump the sealing material through the plenum chamber and create the sealing material wave. The plenum chamber 52 is preferably closed to permit the excess sealing material to return to the sump 50 through appropriate overflow passages not shown. Using a closed plenum chamber also permits the sealing operation to take place in a closed or limited environment. It is believed that a better seal can be formed in such an environment.

As shown in FIG. 4, the closed plenum chamber has an opening 58 which acts as a guide for causing the assembly 11 to pass through the meniscus or approximate center of the molten sealing material wave. By passing the assembly 11 through the meniscus or the approximate center of the wave, an improved seal is effected because the cable assembly interacts with clean molten sealing material.

It has also been discovered that there are addition benefits associated with the use of tensioning device 26, particularly in performing the sealing operation. First, the tensioning device 26 assists in properly aligning the cable assembly 11 so that it passes through the meniscus or approximate center of the sealing material wave. Second, it assists in removing slack from the assembly 11 as it passes into the sealing station 48. In systems where there is no such intermediate tensioning device, slack may be encountered in the cable assembly as it passes from the tube forming station to the tube sealing station. Excessive slack could lead to bends or kinks in the assembly which adversely impacts fiber attenuation.

The sealing material may comprise any suitable solder or brazing material known in the art. Suitable sealing materials include silver solders, tin solders, high-temperature solders and low-temperature solders such as lead-tin solder, lead-antimony solder and tin-antinomy solder.

It has been discovered that it is desirable to expose the assembly 11 to the molten sealing material for a relatively short period of time i.e., a fraction of a second. By limiting the exposure of the assembly to the molten sealing material, the risk of damaging the tube 14 and the fiber or fibers 18 is significantly reduced. Exposure time can be controlled by using a relatively fast line speed and by limiting the length of the wave in the direction of assembly travel. Preferably, the line speed is in the range of about 50 feet per minute to about 100 feet per minute and the length of the wave is less than about six inches.

Immediately after being sealed, the assembly 11 preferably passes through a wiping device 60 to remove any excess sealing material. The wiping device 60 may comprise any suitable automatic or manual wiping system known in the art. For example, wiping device 60 may comprise a wiping die mounted in the exit wall of the plenum chamber 52. Preferably, the wiping device 60 uses an inorganic fibrous material to remove the excess sealing material.

After being wiped, the cable assembly 11 is quenched to bring the temperature of the assembly down to approximately room temperature. The quenching apparatus 62 may comprise any suitable quenching arrangement known in the art; however, it is preferred to use a system that passes the assembly 11 through a water wall. After quenching, the sealed optical fiber cable assembly 11 may be wound on a spool or take-up reel 46 in a level wind or thread wire manner to assure maximum homogeneity to the assembly. As previously mentioned, the take-up reel 46 also provides the exit tension to the assembly 11 leaving the tensioning device 26. The tension applied by the take-up reel 46 assures effective utilization of the tensioning device 26.

If desired, one or more external layers may be fabricated about the cable assembly. For example, a dielectric layer 64, a load bearing layer 66 and/or a protective jacket 68 may be fabricated about the cable assembly. An apparatus for forming all three layers is illustrated is FIG. 6. The dielectric layer 64 for situations where the tube 14 acts as an electrical conductor may be fabricated in any suitable manner using any suitable apparatus 70 known in the art. For example, the dielectric layer 64 may be extruded about the tube 14 using an extrusion die. Although any suitable dielectric material may be used, it is preferred to fabricate the dielectric layer 64 from a high density polyethylene.

If needed, the cable assembly 11 may be provided be with a loadbearing layer 66. The loadbearing layer 66 may be formed from any suitable material such as polyethylene, a polyimide, an epoxy or other similar plastic materials. If desired, the loadbearing layer 66 may comprise a contrahelix of plastic filaments in a thermosetting epoxy matrix. The fabrication of this layer may be done in any known manner using any suitable fabrication device 72, e.g., a die arrangement.

The outer jacket 68 may be used in situations where abrasion resistance or additional protection is needed. The outer jacket 68 may be formed from any suitable material such as a protective plastic, rubber, nylon, neoprene, polyethylene, polyurethane or the like. Any suitable apparatus 74 such as an extrusion die may be used to form the out jacket 68.

The fabrication of the external layer or layers may be done off-line or in-line. The number of external layers to be fabricated depends upon the ultimate use for the optical fiber cable. For example, where the cable is to be deployed in an undersea environment, all three external layers may be used. For above-ground applications, only an outer jacket may be fabricated about the assembly 11.

The optical fiber cable produced by the instant invention can be used in underground, above-ground and undersea communication applications. For example, it could be used to supply data support and power to a deep sea sensor. It could also be used for underground, above-ground and undersea telephone applications.

While the fabrication techniques of the present invention have been described in the context of forming cable assemblies having ultra-small diameter containment tubes, they could also be used to form cable assemblies having large diameter containment tubes.

While the tube forming apparatus of FIG. 3 illustrates the use of a die 30 for forming an open tube section, if desired, forming rolls could be employed to form the open tube section. The final forming of the tube section into the tube, however, should be by die forming as described herein.

While the tape 12 preferably comprises a flat continuous tape, a preformed tape. e.g., a tape having a preformed U-shaped cross section configuration, could also be used.

While it is preferred to encapsulate a buffered optical fiber, it is also possible to use the technique of the present invention to encapsulate a non-buffered optical fiber. An optical fiber having a ceramic or other organic barrier layer may be encapsulated by the present technique.

The U.S. patents and patent applications and the publications set forth in this application are intended to be incorporated by reference herein.

It is apparent that there has been provided in accordance with this invention a novel process and apparatus for forming ultra-small optical fiber cable assemblies which fully satisfy the objects, means, and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

We claim:

1. An apparatus for fabricating an optical fiber cable for use in communication applications, said apparatus comprising:

means for forming an assembly having at least one optical fiber encapsulated in a metallic tube having an ultra-small diameter, said assembly forming means comprising means for forming said tube from a strip of metal or metal alloy in a desired condition;

said tube being characterized by a longitudinally extending seam;

means for sealing said seam to provide a hermetic tubular structure; and means for applying a tensile force to said metal or metal alloy strip to pull said metal or metal alloy strip through said tube forming means, said tensile force applying means being positioned between said tube forming means and said sealing means so as to apply said tensile force to said metal or metal alloy before deration of the condition of said metal or metal alloy.

2. The apparatus of claim 1 further comprising:

said tensile force means comprising a tensioning device rotatable about an axis substantially transverse to the direction of travel of said strip and said tube; and said assembly being wrapped about said tensioning device.

3. The apparatus of claim 2 further comprising:

means for rotating said tensioning device about said axis.

4. The apparatus of claim 2 wherein said tube forming means comprises:

at least one die for forming said strip into a substantially closed tube closely surrounding said at least one optical fiber.

5. The apparatus of claim 4 wherein said tube forming means comprises:

a first die for forming said strip into an open tube section, said at least one optical fiber being positioned within said open tube section; and a second die for closing said tube section about said at least one optical fiber and for placing said seam in a state of compression.

6. The apparatus of claim 4 wherein:

said seam sealing means comprises means for substantially filling said seam with a sealing material.

7. The apparatus of claim 6 wherein said sealing means comprises:

means for forming a wave of sealing material; and means for guiding said assembly through said sealing material wave.

8. The apparatus of claim 7 wherein:

said wave forming means comprises a source of sealing material, a closed plenum chamber, and means for pumping said sealing material into said plenum chamber and creating said wave; and said guide means comprising an aperture in a wall of said plenum chamber.

9. The apparatus of claim 7 further comprising:

means for wiping said assembly to remove excess sealing material.

10. The apparatus of claim 9 further comprising:

means for quenching said assembly after passage through said sealing means.

11. The apparatus of claim 10 further comprising:

means for forming at least one non-metallic layer about said tube.

12. The apparatus of claim 1 further comprising:

means for applying a flux lubricant to at least one surface of said strip prior to said strip entering said tube forming means.

13. A process for forming an optical fiber communication cable, said process comprising:

forming an assembly having at least one optical fiber encapsulated within a metallic tube, said tube having a generally longitudinally extending seam;

said assembly forming step including forming said metallic tube form a strip of metal or metal alloy in a desired condition;

sealing said seam to provide a hermetic tubular assembly;

said sealing step derating said condition of said metal or metal alloy; and wrapping said assembly about a tensioning device to apply the energy needed to form said metal or metal alloy strip into said tube prior to said condition of said metal or metal alloy being derated during said sealing step.

14. The process of claim 13 further comprising:

rotating said tensioning device about an axis substantially transverse to the direction of travel of said strip and said tube.

15. The process of claim 13 wherein said tube forming step comprises:

pulling said strip through at least one die to form about said at least one optical fiber a closely surrounding, substantially closed tube.

16. The process of claim 15 wherein said pulling step comprises:

pulling said strip through a first die to form an open tube section; and pulling said open tube section through a second die to form said substantially closed tube and to place said seam in a state of compression.

17. The process of claim 15 further comprising:

applying a flux lubricant to one surface of said strip prior to pulling said strip through said at least one die.

18. The process of claim 15 wherein said sealing step comprises substantially filling said seam with a sealing material.

19. The process of claim 18 further comprising:

forming a wave of sealing material; and said sealing step comprising passing said assembly through said wave of sealing material.

20. The process of claim 19 further comprising:

wiping said assembly to remove excess sealing material; and quenching said assembly after its passage through said sealing material wave to cool said assembly to approximately room temperature.

21. The process of claim 13 further comprising:

forming at least one non-metallic layer about said tube.

22. The product formed by the process of claim 13.

* * * * *